(12) United States Patent
Kim et al.

(10) Patent No.: US 9,199,308 B2
(45) Date of Patent: Dec. 1, 2015

(54) METHOD OF PRODUCING COMPOSITE ARTICLES AND ARTICLES MADE THEREBY

(75) Inventors: Chongmin Kim, Bloomfield Township, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 932 days.

(21) Appl. No.: 13/237,249

(22) Filed: Sep. 20, 2011

(65) Prior Publication Data
US 2013/0071681 A1 Mar. 21, 2013

(51) Int. Cl.
| | | |
|---|---|---|
| *B22F 3/02* | (2006.01) | |
| *B32B 5/16* | (2006.01) | |
| *C22C 14/00* | (2006.01) | |
| *B22F 7/08* | (2006.01) | |
| B22F 3/18 | (2006.01) | |
| B22F 3/20 | (2006.01) | |
| F16F 1/02 | (2006.01) | |
| B22F 3/093 | (2006.01) | |
| B22F 5/12 | (2006.01) | |

(52) U.S. Cl.
CPC ... *B22F 3/02* (2013.01); *B22F 7/08* (2013.01); *B32B 5/16* (2013.01); *C22C 14/00* (2013.01); B22F 3/093 (2013.01); B22F 3/18 (2013.01); B22F 3/20 (2013.01); B22F 5/12 (2013.01); B32B 2264/105 (2013.01); F16F 1/021 (2013.01); Y10T 428/12097 (2015.01); Y10T 428/239 (2015.01)

(58) Field of Classification Search
USPC ........................................................ 419/6, 8
See application file for complete search history.

(56) References Cited

U.S. PATENT DOCUMENTS

| | | | | |
|---|---|---|---|---|
| 3,631,583 | A | * | 1/1972 | Haller ............................. 419/48 |
| 3,729,281 | A | | 4/1973 | Nakai et al. |
| 3,772,935 | A | | 11/1973 | Dunn et al. |
| 3,780,418 | A | * | 12/1973 | Hurst .............................. 419/42 |
| 4,090,873 | A | * | 5/1978 | Takamura et al. ................ 419/8 |
| 4,219,357 | A | | 8/1980 | Froes et al. |
| 4,460,527 | A | | 7/1984 | Kato |
| 4,565,668 | A | | 1/1986 | Aslund et al. |
| 4,602,952 | A | * | 7/1986 | Greene et al. ................... 75/228 |
| 4,696,777 | A | | 9/1987 | Ito |
| 4,756,677 | A | * | 7/1988 | Hribernik et al. ................. 419/8 |
| 4,935,198 | A | | 6/1990 | Tornberg |
| 5,183,632 | A | | 2/1993 | Kiuchi et al. |
| 5,574,957 | A | | 11/1996 | Barnard et al. |
| 5,620,042 | A | | 4/1997 | Ihm |
| 6,319,437 | B1 | | 11/2001 | Elsner et al. |
| 6,423,264 | B1 | | 7/2002 | Gay |

OTHER PUBLICATIONS

About Titanium and Titanium Alloys article at http://materials.globalspec.com/LearnMore/Meterials_Chemicals_Adhesives/Metals_Alloy . . . , 2 pages.
Titanium-Forming article at http://www.azom.com/Details.asp?ArticleID=1246, 8 pages.
Titanium and Titanium Alloys article at http://www.key-to-metals.com/Article20.htm , 4 pages.

* cited by examiner

*Primary Examiner* — George Wyszomierski
*Assistant Examiner* — Ngoclan T Mai
(74) *Attorney, Agent, or Firm* — BrooksGroup

(57) ABSTRACT

One embodiment of the invention may include a method of producing a composite article comprising a container, filling the container with a powdered metal, and compacting the powdered metal in the container such that an interfacial bond is created between the compacted powdered metal and the container.

14 Claims, 2 Drawing Sheets

METHOD OF PRODUCING COMPOSITE ARTICLES AND ARTICLES MADE THEREBY

TECHNICAL FIELD

In at least one embodiment, the present invention relates to method of producing composite articles. In at least one embodiment, the present invention also relates to composite articles and to composite articles made from encapsulated powder.

BACKGROUND

In the past, articles have been produced from powdered metals by compaction. These powdered metals may all differ with respect to size, morphology, and reactivity to oxygen. In some instances, the powdered metal or the powdered metal alloys may be reactive to oxygen at ambient conditions causing undesirable properties in a final article.

The metal powders, such as by way of non-limiting example, titanium powder and titanium alloy powders may be compacted by any suitable method such as by cold isostatic pressing (CIP), hot isostatic pressing (HIP), or extrusion to form an article of desired configuration. In some instances, the powdered metal may undergo a first compaction to a near net shape and then a final compaction to a net shape component.

Powders that are reactive in air are often placed in a protective canister before being subjected to processing into bulk shapes. Further, powders that are not reactive may also be placed in a container to facilitate containing and handling of the powder during industrial processing.

Some prior art patents that discuss the use of a container in connection with fabrication of powdered metal components are U.S. Pat. No. 4,219,357 to Yolton et al, U.S. Pat. No. 4,565,669 to Aslund et al and U.S. Pat. No. 4,935,198 to Tornberg.

SUMMARY OF THE INVENTION

One embodiment of the invention may include a method of producing a composite article comprising a container, filling the container with a powdered metal, and compacting the powdered metal in the container such that an interfacial bond is created between the compacted powdered metal and the container.

One embodiment of the invention may include a composite article. The composite article comprises a compacted powdered metal formed to a predetermined configuration. An outer material is disposed about the compacted powder material. The outer material is bonded to the compacted powdered material to form a composite.

Other exemplary embodiments of the disclosure will become apparent from the detailed description. It should be understood that the detailed description and specific examples, while indicating the exemplary embodiments of the disclosure, are intended for illustration purposes only and not intended to limit the scope of the invention.

BRIEF DESCRIPTION OF THE DRAWINGS

The disclosure will now be described, by way of example, and not limitation, with reference to the accompanying drawings. The following is a brief description of the drawings.

DETAILED DESCRIPTION OF THE EXEMPLARY EMBODIMENT(S)

The following description of the preferred embodiment(s) is merely exemplary in nature and is in no way intended to limit the invention, its application, or uses.

Figure 1:
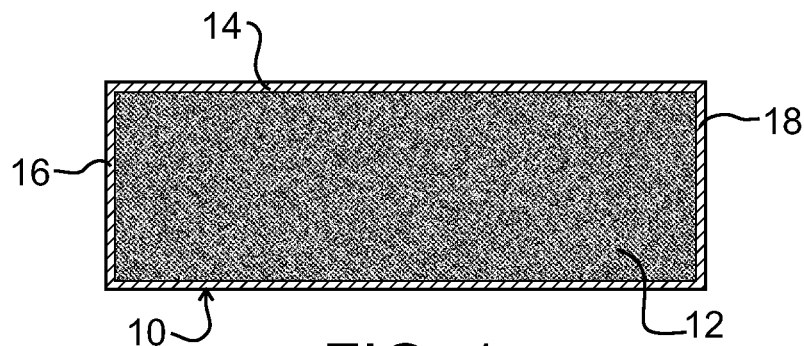
FIG. 1 is a cross-sectional view of the container filled with powder material.

FIG. 1 shows a cross-sectional view of a container generally indicated at 10. The container 10 is filled with a powder 12 of metal and/or metal alloy material. The container 10 is then closed to isolate the powder from the atmosphere. In one embodiment, the container 10 may be evacuated prior to being closed. Alternatively, the container 10 may be purged of air and filled with an inert gas prior to closing.

The container 10 may take any suitable configuration. By way of non-limiting example, the container 10 may be generally cylindrical, having a circular cross-section. In another example, the container may take the geometric configuration near the net shape of the part to be produced. It will be appreciated, however, that the container 10 may take any suitable geometric configuration. The container 10 may have at least one wall 14. In one embodiment, as shown in FIG. 1, the container 10 may have an annular wall 14 and a pair of end walls 16, 18. The annular wall 14 may be closed by end walls 16, 18 to form the container 10

The powder material may comprise a powder of a metal and/or a metal alloy that is capable of being compacted to a final desired shape. By way of non-limiting examples, the powder may comprise powdered titanium, zirconium, hafnium, tantalum, columbium, uranium, aluminum, iron, nickel and alloys and combinations thereof. It will be appreciated, however, that any suitable metal or metal alloy powder that may be compacted to form a final desired shape may be used within the context of the invention.

In one embodiment, the powder may comprise titanium and/or titanium alloy. Titanium offers good strength to weight ratio, mechanical properties and corrosion resistance making it an acceptable choice in certain applications. However, in certain instances, titanium products can be affected by post compacting operations. For example, welding, if not performed carefully, has the potential to contaminate a titanium compact by introducing interstitial impurities. Other compacted materials may exhibit the same or other effects. Accordingly, it may be desirable in some instances to enhance or alter the properties of the compacted metal In one embodiment, the container 10 is intended to become part of the final composite article generally shown at 20 in FIG. 3. That is, the material that comprises the walls 14, 16, and 18 for the container 10, the encasing material, becomes integral with the compacted powder 22 to form the final compacted part or composite article. The encasing material may become integral with the compacted powder by forming an interfacial bond such as by diffusion, mechanical bonding or locking, or the formation of a controlled layer of intermetallics such as by liquid phase reactions or other mass transport mechanisms between the compacted powder 22 and the encasing material. In this manner the encasing material may be bonded to the compacted metal. In one embodiment, the encasing material should enable processing of the encasing material and powder 12 in air.

Figure 3:
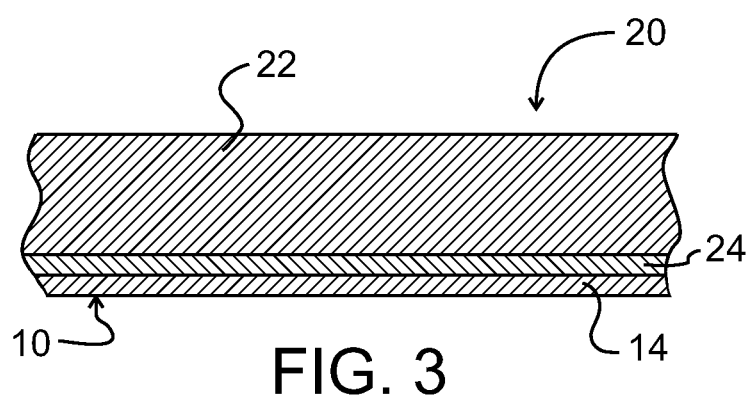
FIG. 3 is a cross-sectional view of an embodiment, partially broken away, of an article according to an embodiment of the invention.

As shown in FIG. 3, the encasing material that makes up the wall 14 is bonded to the compacted powder 22 shown at bond layer 24. Layer 24 can be formed in any suitable manner. Layer 24 represents any suitable bond or interaction between the encasing material 14 and the compacted powder 22 sufficient to integrate the two. While this bond or interaction is represented by layer 24, it will be appreciated that a distinct layer need not be formed nor must layer 24 be uniform. Thus, layer 24 may comprise any suitable bond or interaction between the encasing material and compacted powder 22 that integrates the encasing material and compacted powder 22, such as by way of non-limiting example, a diffusion layer, a mechanical bond or locking or a controlled layer of intermetallics. Further, this layer 24 may be formed between walls 14, 16, and 18 and the compacted powder 22. In this manner, the container 10 becomes an integral component of the final compacted part 20.

The encasing material can comprise any suitable material. By way of non-limiting example, the encasing material may comprise metal materials and alloys or combination thereof such as aluminum or magnesium, titanium, zirconium, hafnium, tantalum, columbium, uranium, iron, nickel and alloys and combinations thereof (which may or may not be fully compacted). Alternatively, the encasing material may comprise or include ceramic material. Such materials can be used if they can be bonded or sintered to be integral with the powdered material. In some instances wetting additives may be necessary to enhance the bonding or sintering process. The encasing material may be chosen to alter and perhaps enhance the properties of the compacted powder material. For example, the encasing material could impart fatigue strength or other desirable properties, such as by way of non-limiting example, corrosion resistance, paintabiity, weldability or any other property that may be desired of the final compacted part 20. Further, the encasing material may be fully densified or partially densified prior to compaction. If partially densified, the container can be more fully densified or compacted during the compaction process. The surface of the encasing material may be ground or machined to provide required dimensions, or may be finished in a method such as, but not limited to etching, polishing, anodizing, or any other finishing method to meet additional product requirements.

In one embodiment, the encasing material may be the same as the powder material. In such a case, the encasing material may be at least partially compacted. In another embodiment, the encasing material may be different from the powder material.

In order to compact the powder within the container, the container and powder may be exposed to one or more processing steps. In one embodiment, the metal or metal alloy powder 22 is placed in a container comprised of the encasing material. The container 10 may be evacuated and sealed. Alternatively, the container 10 may be purged of air and filled with an inert gas. The container, having the powder therein may then processed, such as by way of non-limiting example, by extrusion. The extrusion takes place through an extrusion tool 26 at a suitable temperature, extrusion rate and extrusion ratio into the final desired product cross-section.

Figure 2:
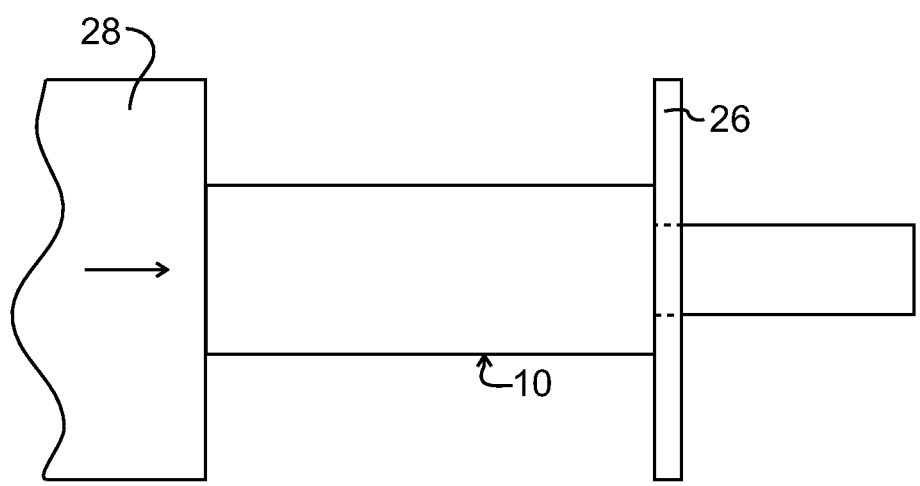
FIG. 2 is a schematic diagram of an embodiment for compacting the container and powder.

This extrusion process is shown schematically in FIG. 2. As shown in FIG. 2, the container 10 having the powder is passed through and extrusion die 26 under the force of a ram 28 in the direction of the arrow and forms a desired shape. As the container having the powder therein is extruded, the powder material is compacted or densified, forming a composite article. The degree of the compactness may be controlled by controlling one or more of the processing parameters discussed above. Further, the microstructure of the formed compact may also be controlled by controlling the processing parameters.

Further, in an embodiment, the compact may be subjected to a further compaction or densification process. This may occur, by way of non-limiting example, when the area ratio of the original container and powder cross-section to the final product cross-section is excessively high. It may be more desirable to attain the final composite article in two stages: the first stage accomplishing a precursor by extrusion or other suitable forming process; and the second stage, comprising another extrusion process or any other suitable compaction process that compacts the precursor and produces a composite article with the finished dimensions.

The compacting process has been discussed in connection with single and multi-stage extrusion. It will be appreciated that any suitable method for compacting the powder material and integrating it with the encasing material may be used. Further, the compacted shape may be formed in successive compacting operations which differ from one another. By way of non-limiting example, the container having the powder material may first be subjected to extrusion, forming a precursor. The precursor may further be compacted such as by drawing to a final desired shape.

Some of the suitable processes for compacting the powder and container may include extrusion, mandrel-assisted rolling or wire drawing. The specific process chosen should be chosen to optimize compaction depending on the final shape desired. By way of non-limiting example, for fine wires for small springs, drawing may be appropriate. Wires for suspension springs may be hot-rolled. It will be appreciated that any suitable process for compacting the metal in the container may be used. Additionally, the processing parameters, such as by way of non-limiting example, temperature, composition ratio and processing rate, can be optimized to achieve the desired level of compactness and grain structure of the powder material.

The powder consolidation process may also be further enhanced by application of vibration, mechanical or ultrasonic methods as are known in the industry. That is, compaction may be enhanced by subjecting the container containing the powder therein to an ultrasonic vibration prior to or in conjunction with the compaction process. Incorporation of such methods may precompact the powder to a desired degree before complete compaction.

In one embodiment, compacting may be achieved to provide a substantially fully dense article. It will be appreciated that in other embodiments, compacting may be achieved to provide an article that is less than fully dense. This may be useful when the compacted powder may not be subject to high loads. In such a case, the powder 12 may not need be compacted to full density. This may be useful when the surface of the compact is the region that supports the majority of the load.

Figure 4:
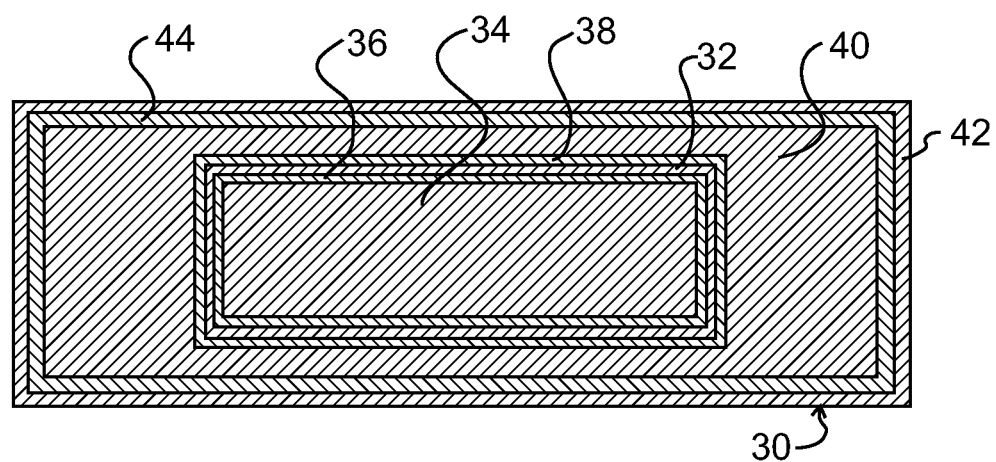
FIG. 4 is a cross-sectional view, partially broken away, of an article according to an alternate embodiment of the invention.

In one embodiment as shown in FIG. 4, multiple containers may be used. For example two or more layers of compacted powder material may be created by the use of a second container being place around the first container. FIG. 4 shows a composite part 30 made using multiple containers. A first container 32 contains a compacted powder metal powder 34. A bond layer 36 is formed between the first container 32 and the compacted powder 34. Another bond layer 38 is formed between the first container 32 and compacted powder 40 which is contained in a second container 42. A bond layer 44 is formed between the second container 42 and the compacted powder 40. Each of the bond layers 36, 38, and 44 may be of the type described above.

In order to make the composite part 30, each container 32, 42 may contain powder material. A powder material may comprise powdered metal and may be placed in a first container 32. The first container 32 may be evacuated or purged of air and filled with an inert gas and sealed. The first container 32 having the powder material therein may then be placed in a second container 42, which may also include a powder material therein. It will be appreciated that the second container 42 may be filled with powder material, which may comprise powdered metal, before or after adding the first container 32. Alternatively, some powder material may be placed in the second container 42 prior to adding the first container 32, and then filling of the second container 42 with powder material can be completed. The second container 42 may then be evacuated or purged of air then filled with an inert gas and sealed.

The powder material in the first container may be the same as or different from the powder material in the second container. Similarly, the encasing material of the first container may be the same as or different from the encasing material of the second container. Additionally, the first container and second container may have the same or different geometric configuration. The containers may then be compacted or densified in the manner set forth above to produce the composite article 30. The composite article 30 may comprise an integral composite wherein the components are bonded in the manner set forth above. While two containers are shown, it will be appreciated that any number of containers may be used.

The above process can be used to make a composite article. Generally, the composite article may comprise a compacted powdered metal formed to a predetermined configuration. The composite article further may comprise an outer material disposed about the compacted powder material. The outer material is bonded to the compacted powdered material to form a composite article having a predetermined configuration. Any suitable powder metal and encasing material may be used. Their selection is made to optimize the properties of the composite article for its given application. It will be appreciated that the composite article can take any geometric configuration. Further, the dimensions of the containers and the processing parameters may be dependent on the final geometric configuration of the composite article.

The process set forth above may be well adapted to make components having circular cross sections, such as for use in coil springs which may be used as valve springs. Further, the process may be well adapted to make rectangular cross sections, such as for use in plate springs. Generally, the process may be well adapted to make parts having uniform cross sections. Another composite article may comprise engine valve lifters. In each of the coil springs, plate springs and valve lifters, a high ratio of strength to density of powder material may be achieved to reduce component weight and enhance performance. It will be appreciated that the composite component can comprise any component made from compacted powder where the encasing material may be incorporated into the final composite to impart specific properties no necessarily provided by the compacted powder material.

While exemplary embodiments of the disclosure have been described above, it will be recognized and understood that various modifications can be made by those of ordinary skill in the art. The appended claims are intended to cover all such modifications which may fall within the spirit and scope of the invention.

What is claimed is:

1. A method of producing a composite article comprising:
   providing a first container comprising an encasing material;
   filling the first container with a powdered metal;
   compacting the powdered metal in the first container such that an interfacial bond is created between the compacted powdered metal and the encasing material
   providing a second container, placing the first container filled with powdered metal in the second container;
   filling the second container comprising a second encasing material with a powdered metal; and
   compacting the powdered metal in the the second container.

2. A method as set forth in claim 1 wherein the compacting is done in multiple stages.

3. A method as set forth in claim 1 wherein said compacting comprises at least one of extrusion, drawing, or mandrel-assisted rolling.

4. A method as set forth in claim 1 further comprising evacuating the container.

5. A method as set forth in claim 1 further comprising purging the container of air.

6. A method as set forth in claim 1 wherein the compacting at least partially compacts the powdered metal.

7. A method as set forth in claim 1 wherein the encasing material comprises a material selected to have properties different from the properties of compacted powdered metal.

8. A method as set forth in claim 1 wherein the interfacial bond is created by at least one of diffusion, mechanical bonding or locking or formation of a layer of intermetallics.

9. A method as set forth in claim 1 wherein the powdered metal comprises at least one of titanium, zirconium, hafnium, tantalum, columbium, uranium, aluminum, magnesium, iron, nickel and alloys or combinations thereof.

10. A method as set forth in claim 1 wherein said encasing material comprises at least one of titanium, zirconium, hafnium, tantalum, columbium, uranium, aluminum, magnesium, iron, nickel, ceramics or alloys and combinations thereof.

11. A method as set forth in claim 1 wherein said encasing material is at least partially compacted.

12. A method as set forth in claim 11 further comprising compacting the encasing material while compacting the powdered metal in the container.

13. A method of producing a composite article comprising:
    providing a container comprising an encasing material;
    filling the container with a powdered metal;
    compacting the powdered metal in the container such that an interfacial bond is created between the compacted powdered metal and the encasing material; and
    providing a second container, placing the container filled with powdered metal in the second container, filling the second container comprising a second encasing material with a powdered metal and compacting the powdered metal in the container and the second container such that an interfacial bond is created between at least one of a) the compacted powdered metal in the container and the encasing material of the container, b) the compacted metal powder in the second container and the encasing material of the container, or c) the compacted metal powder in the second container and the second encasing material of the second container.

14. A method as set forth in claim 13 wherein the second encasing material is different from the encasing material.

* * * * *